United States Patent
Khaleghi et al.

(10) Patent No.: US 6,317,422 B1
(45) Date of Patent: Nov. 13, 2001

(54) METHODS AND APPARATUS OF N-CHIP RESISTANT SPREADING IN CDMA SYSTEMS

(75) Inventors: Farideh Khaleghi; Norman P. Secord; Leo Strawczynski, all of Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/060,604

(22) Filed: Apr. 15, 1998

(51) Int. Cl.[7] .................................................. H04B 7/216
(52) U.S. Cl. .......................... 370/342; 370/208; 370/335; 375/130
(58) Field of Search .................................. 370/328, 329, 370/331, 335, 342, 343, 441, 203, 208, 209; 375/130, 135, 139, 140, 146; 455/422, 436, 450

(56) References Cited

U.S. PATENT DOCUMENTS

| | | | |
|---|---|---|---|
| 5,603,096 | * 2/1997 | Gilhousen et al. | 455/69 |
| 5,751,705 | * 5/1998 | Sato | 370/335 |
| 5,812,938 | * 9/1998 | Gilhousen et al. | 455/69 |
| 5,933,424 | * 8/1999 | Muto | 370/342 |
| 5,982,763 | * 11/1999 | Sato | 370/342 |
| 6,091,762 | * 7/2000 | Davis et al. | 375/208 |

* cited by examiner

Primary Examiner—Ajit Patel
Assistant Examiner—Bob A. Phunkulh
(74) Attorney, Agent, or Firm—Dennis R. Haszko; Cobrin & Gittes

(57) ABSTRACT

Methods and apparatus for generating spreading codes in a CDMA system are disclosed in accordance with the teachings of the present invention wherein the system includes a pseudonoise (PN) code generator and a logic device configured to replace a portion of a PN code generated by the PN code generator with at least one zero or to add at least one zero to a PN code generated by the PN code generator. The PN code generator generates a PN code made up of chips. One or more of these chips may be replaced by zeros or one or more zeros may be inserted between chips. Thus, when combined at a chip level with a substantially orthogonal code such as a Walsh code the resulting spreading code will be less effected and in some instances not effected at all by certain time delays inserted into the system (i.e time lag from multi-path dispersive transmissions).

8 Claims, 19 Drawing Sheets

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | $W_{1,4}P_4$ | $W_{1,5}P_5$ | $W_{1,6}P_6$ | $W_{1,7}P_7$ | ... |
| USER 2 | $W_{2,1}P_1$ | $W_{2,2}P_2$ | $W_{2,3}P_3$ | $W_{2,4}P_4$ | $W_{2,5}P_5$ | $W_{2,6}P_6$ | $W_{2,7}P_7$ | ... |

FIG. 1

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | $W_{1,4}P_4$ | $W_{1,5}P_5$ | $W_{1,6}P_6$ | $W_{1,7}P_7$ | ... |
| USER 2 | DELAY | $W_{2,1}P_1$ | $W_{2,2}P_2$ | $W_{2,3}P_3$ | $W_{2,4}P_4$ | $W_{2,5}P_5$ | $W_{2,6}P_6$ | ... |

FIG. 2

| CHIP # | 1 | 2 | 3 | 4 | 5 | 6 | 7 | ... |
|---|---|---|---|---|---|---|---|---|
| USER 1 | $W_{1,1}P_1$ | 0 | $W_{1,2}P_3$ | 0 | $W_{1,3}P_5$ | 0 | $W_{1,4}P_7$ | ... |
| USER 2 | $W_{2,1}P_1$ | 0 | $W_{2,2}P_3$ | 0 | $W_{2,3}P_5$ | 0 | $W_{2,4}P_7$ | ... |

10

| CHIP # | 1 | 2 | 3 | 4 | 5 | 6 | 7 | ... |
|---|---|---|---|---|---|---|---|---|
| USER 1 | $W_{1,1}P_1$ | 0 | 0 | $W_{1,2}P_4$ | 0 | 0 | $W_{1,3}P_7$ | ... |
| USER 2 | $W_{2,1}P_1$ | 0 | 0 | $W_{2,2}P_4$ | 0 | 0 | $W_{2,3}P_7$ | ... |

| CHIP # | 1 | 2 | 3 | 4 | 5 | 6 | 7 | ... |
|---|---|---|---|---|---|---|---|---|
| USER 1 | 0 | $W_{1,1}P_2$ | 0 | $W_{1,2}P_4$ | 0 | $W_{1,3}P_6$ | 0 | ... |
| USER 2 | 0 | $W_{2,1}P_2$ | 0 | $W_{2,2}P_4$ | 0 | $W_{2,3}P_6$ | 0 | ... |

40

| CHIP # | 1 | 2 | 3 | 4 | 5 | 6 | 7 | ... |
|---|---|---|---|---|---|---|---|---|
| USER 1 | 0 | 0 | $W_{1,1}P_3$ | 0 | 0 | $W_{1,2}P_6$ | 0 | ... |
| USER 2 | 0 | 0 | $W_{2,1}P_3$ | 0 | 0 | $W_{2,2}P_6$ | 0 | ... |

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | 0 | $W_{1,3}P_4$ | $W_{1,4}P_5$ | 0 | $W_{1,5}P_7$ | ... |
| USER 2 | $W_{2,1}P_1$ | $W_{2,2}P_2$ | 0 | $W_{2,3}P_4$ | $W_{2,4}P_5$ | 0 | $W_{2,5}P_7$ | ... |

50

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | 0 | 0 | $W_{1,3}P_5$ | $W_{1,4}P_6$ | 0 | ... |
| USER 2 | $W_{2,1}P_1$ | $W_{2,2}P_2$ | 0 | 0 | $W_{2,3}P_5$ | $W_{2,4}P_6$ | 0 | ... |

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | 0 | $W_{1,4}P_5$ | $W_{1,5}P_6$ | $W_{1,6}P_7$ | ... |
| USER 2 | $W_{2,1}P_1$ | $W_{2,2}P_2$ | $W_{2,3}P_3$ | 0 | $W_{2,4}P_5$ | $W_{2,5}P_6$ | $W_{2,6}P_7$ | ... |

80

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | 0 | 0 | $W_{1,4}P_6$ | $W_{1,5}P_7$ | ... |
| USER 2 | $W_{2,1}P_1$ | $W_{2,2}P_2$ | $W_{2,3}P_3$ | 0 | 0 | $W_{2,4}P_6$ | $W_{2,5}P_7$ | ... |

90

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | 0 | 0 | 0 | $W_{1,4}P_7$ | ... |
| USER 2 | $W_{2,1}P_1$ | $W_{2,2}P_2$ | $W_{2,3}P_3$ | 0 | 0 | 0 | $W_{2,4}P_7$ | ... |

FIG. 14

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | $W_{1,4}P_4$ | 0 | $W_{1,5}P_6$ | $W_{1,6}P_7$ | ... |
| USER 2 | $W_{2,1}P_1$ | $W_{2,2}P_2$ | $W_{2,3}P_3$ | $W_{2,4}P_4$ | 0 | $W_{2,5}P_6$ | $W_{2,6}P_7$ | ... |

100

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | $W_{1,4}P_4$ | $W_{1,5}P_5$ | 0 | $W_{1,6}P_7$ | ... |
| USER 2 | $W_{2,1}P_1$ | $W_{2,2}P_2$ | $W_{2,3}P_3$ | $W_{2,4}P_4$ | $W_{2,5}P_5$ | 0 | $W_{2,6}P_7$ | ... |

110

| CHIP # | 1 | 2 | 3 | 4 | 5 | 6 | 7 | ... |
|---|---|---|---|---|---|---|---|---|
| USER 1 | $W_{1,1}P_1$ | $W_{1,2}P_2$ | $W_{1,3}P_3$ | $W_{1,4}P_4$ | $W_{1,5}P_5$ | $W_{1,6}P_6$ | 0 | ... |
| USER 2 | $W_{2,1}P_1$ | $W_{2,2}P_2$ | $W_{2,3}P_3$ | $W_{2,4}P_4$ | $W_{2,5}P_5$ | $W_{2,6}P_6$ | 0 | ... |

| CHIP # | 1 | 2 | 3 | 4 | 5 | 6 | 7 | ... |
|---|---|---|---|---|---|---|---|---|
| USER 1 | 0 | $W_{1,1}P_2$ | $W_{1,2}P_3$ | 0 | $W_{1,3}P_5$ | $W_{1,4}P_6$ | 0 | ... |
| USER 2 | 0 | $W_{2,1}P_2$ | $W_{2,2}P_3$ | 0 | $W_{2,3}P_5$ | $W_{2,4}P_6$ | 0 | ... |

130

| CHIP # | 1 | 2 | 3 | 4 | 5 | 6 | 7 | ... |
|---|---|---|---|---|---|---|---|---|
| USER 1 | 0 | 0 | $W_{1,1}P_3$ | $W_{1,2}P_4$ | 0 | 0 | $W_{1,3}P_7$ | ... |
| USER 2 | 0 | 0 | $W_{2,1}P_3$ | $W_{2,2}P_4$ | 0 | 0 | $W_{2,3}P_7$ | ... |

140

| CHIP # | 1 | 2 | 3 | 4 | 5 | 6 | 7 | ... |
|---|---|---|---|---|---|---|---|---|
| USER 1 | 0 | 0 | 0 | $W_{1,1}P_4$ | $W_{1,2}P_5$ | 0 | 0 | ... |
| USER 2 | 0 | 0 | 0 | $W_{2,1}P_4$ | $W_{2,2}P_5$ | 0 | 0 | ... |

| CHIP # | 1 | 2 | 3 | 4 | 5 | 6 | 7 | ... |
|---|---|---|---|---|---|---|---|---|
| USER 1 | 0 | $W_{1,1}P_2$ | $W_{1,2}P_3$ | $W_{1,3}P_4$ | 0 | $W_{1,4}P_6$ | $W_{1,5}P_7$ | ... |
| USER 2 | 0 | $W_{2,1}P_2$ | $W_{2,2}P_3$ | $W_{2,3}P_4$ | 0 | $W_{2,4}P_6$ | $W_{2,5}P_7$ | ... |

160

| CHIP # | 1 | 2 | 3 | 4 | 5 | 6 | 7 | ... |
|---|---|---|---|---|---|---|---|---|
| USER 1 | 0 | $W_{1,1}P_2$ | $W_{1,2}P_3$ | $W_{1,3}P_4$ | $W_{1,4}P_5$ | 0 | $W_{1,5}P_7$ | ... |
| USER 2 | 0 | $W_{2,1}P_2$ | $W_{2,2}P_3$ | $W_{2,3}P_4$ | $W_{2,4}P_5$ | 0 | $W_{2,5}P_7$ | ... |

170

| CHIP # | 1 | 2 | 3 | 4 | 5 | 6 | 7 | ... |
|---|---|---|---|---|---|---|---|---|
| USER 1 | 0 | $W_{1,1}P_2$ | $W_{1,2}P_3$ | $W_{1,3}P_4$ | $W_{1,4}P_5$ | $W_{1,5}P_6$ | 0 | ... |
| USER 2 | 0 | $W_{2,1}P_2$ | $W_{2,2}P_3$ | $W_{2,3}P_4$ | $W_{2,4}P_5$ | $W_{2,5}P_6$ | 0 | ... |

| CHIP # | 1 | 2 | 3 | 4 | 5 | 6 | 7 | ... |
|---|---|---|---|---|---|---|---|---|
| USER 1 | 0 | 0 | $W_{1,1}P_3$ | $W_{1,2}P_4$ | $W_{1,3}P_5$ | 0 | 0 | ... |
| USER 2 | 0 | 0 | $W_{2,1}P_3$ | $W_{2,2}P_4$ | $W_{2,3}P_5$ | 0 | 0 | ... |

190

| CHIP # | 1 | 2 | 3 | 4 | 5 | 6 | 7 | ... |
|---|---|---|---|---|---|---|---|---|
| USER 1 | 0 | 0 | $W_{1,1}P_3$ | $W_{1,2}P_4$ | $W_{1,3}P_5$ | $W_{1,4}P_6$ | 0 | ... |
| USER 2 | 0 | 0 | $W_{2,1}P_3$ | $W_{2,2}P_4$ | $W_{2,3}P_5$ | $W_{2,4}P_6$ | 0 | ... |

200

| CHIP # | 1 | 2 | 3 | 4 | 5 | 6 | 7 | ... |
|---|---|---|---|---|---|---|---|---|
| USER 1 | 0 | 0 | $W_{1,1}P_3$ | $W_{1,2}P_4$ | $W_{1,3}P_5$ | $W_{1,4}P_6$ | $W_{1,5}P_7$ | ... |
| USER 2 | 0 | 0 | $W_{2,1}P_3$ | $W_{2,2}P_4$ | $W_{2,3}P_5$ | $W_{2,4}P_6$ | $W_{2,5}P_7$ | ... |

| CHIP # | 1 | 2 | 3 | 4 | 5 | 6 | 7 | ... |
|---|---|---|---|---|---|---|---|---|
| USER 1 | $W_{1,1}P_1$ | 0 | $W_{1,2}P_3$ | 0 | $W_{1,3}P_5$ | 0 | $W_{1,4}P_7$ | ... |
| USER 2 | DELAY | $W_{2,1}P_1$ | 0 | $W_{2,2}P_3$ | 0 | $W_{2,3}P_5$ | 0 | ... |

FIG. 19

METHODS AND APPARATUS OF N-CHIP RESISTANT SPREADING IN CDMA SYSTEMS

FIELD OF THE INVENTION

The invention relates generally to the field of wireless communication systems and more particularly, to systems and methods of creating spreading codes in a CDMA system which are substantially orthogonal in a quasi-synchronous situation and thus resistant to misalignment caused by multi-path delays and/or time jitter of the system and/or misalignment of signals received from different users.

BACKGROUND OF THE INVENTION

For severely multipath dispersive environments, the downlink capacity of cellular Code Division Multiple Access (CDMA) systems, such as IS95, is limited by intra-cell interference. Downlink signals in a cell are orthogonal or substantially orthogonal at the transmitter (hereinafter the term orthogonal or substantially orthogonal includes the terms orthogonal and/or substantially orthogonal), but tend to suffer a loss of orthogonality due to multi-path propagation, time jitter (imprecise implementation errors), etc. The uplink capacity of CDMA systems, such as IS95, is also limited because the uplink signals are not orthogonal. However, orthogonal signals may be used for the uplink if different user symbols are received with timing alignment.

For nondispersive channels, time alignment of the signals results in orthogonality and rejection of the intra-cell interference. In reality, however, wireless channels are dispersive and propagation along multiple paths causes time misalignment in which case multi-path components will interfere with other multi-path components having a different delay. In this case it is generally only possible to align a single component from each signal. Therefore, orthogonality is partially lost due to the interference between non-aligned terms.

Accordingly there exists a need for a system and method of spreading which is resistant to misalignment (delay) caused by multi-path delays.

There also exists a need for a system and method of spreading which is resistant to interference caused by time jitter of the system.

A need also exists for a system and method of spreading which is resistant to interference caused by misalignment of the signals received from different users.

Accordingly it is an object of the present invention to provide systems and methods of spreading in CDMA systems which are resistant to effects of misalignment caused by multi-path propagation delays.

It is another object of the present invention to provide systems and methods of generating spreading codes which are resistant to effects of time jitter of the system.

It is a further object of the present invention to provide systems and methods of generating spreading codes which are resistant to effects of misalignment of signals from different users.

It is still another object of the invention to provide such codes which do not affect the data rate of the system.

These and other objects of the invention will become apparent to those skilled in the art from the following description thereof.

SUMMARY OF THE INVENTION

In accordance with the teachings of the present invention, these and other objects may be accomplished by the present systems and methods of generating spreading codes which are resistant to misalignment caused by multi-path delays and/or time jitter of the system and/or misalignment of signals received from different users in CDMA systems. An embodiment of the present invention includes an apparatus for generating spreading codes including means for generating a substantially orthogonal code, and means for inserting at least one zero into a code generated by the substantially orthogonal code generating means.

In an exemplary embodiment of the invention, the system includes an apparatus for generating spreading codes including means for generating a substantially orthogonal code, means for generating a pseudonoise (PN) code, means for combining a PN code generated by the PN code generating means with a code generated by the substantially orthogonal code generating means and means for inserting zeros into a code generated by the combining means.

In another embodiment of the invention, the system includes an apparatus for generating spreading codes including a pseudonoise (PN) code generator and a logic controlled multiplexor logically connected to the PN code generator. The multiplexor may be configured to alter a PN code generated by the PN code generator by replacing at least a portion of the PN code with at least one zero. The embodiment further includes a Walsh code generator and a multiplier logically connected to the Walsh code generator and to the PN code generator and configured to combine a Walsh code generated by the Walsh code generator with the altered PN code.

In an embodiment of the invention, the system includes an apparatus for generating spreading codes including a pseudonoise (PN) code generator and a logic controlled multiplier logically connected to the PN code generator and configured to alter a PN code generated by the PN code generator by multiplying at least a portion of the PN code by zero. The apparatus further includes a Walsh code generator; a multiplier connected to both the Walsh code generator and to the PN code generator and configured to combine a Walsh code generated by the Walsh code generator with the altered PN code.

In another embodiment of the invention the system includes an apparatus for generating spreading codes including a pseudonoise (PN) code generator, a microprocessor connected to the PN code generator and configured to alter a PN code generated by the PN code generator. The system further includes a Walsh code generator, a multiplier connected to both the Walsh code generator and to the PN code generator and configured to combine a Walsh code generated by the Walsh code generator with the altered PN code.

In another embodiment of the invention the system includes a method of generating spreading codes by generating a substantially orthogonal code made up of chips and generating a new substantially orthogonal code by inserting at least one zero into the substantially orthogonal code.

In yet another embodiment of the invention the system includes a method of generating time delay resistant spreading codes by generating a pseudonoise (PN) code including multiple chips, generating a new PN code from the PN code by replacing at least one of the chips by a zero, such that the new PN code includes at least one zero chip and at least one non-zero chip. The method further includes generating a substantially orthogonal code including multiple chips and combining the new PN code with the substantially orthogonal code by multiplying the non-zero PN code chips by the substantially orthogonal code chips on a chip by chip basis.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which:

FIG. 1 depicts codes used in conventional CDMA systems for the forward link.

FIG. 2 depicts the codes of FIG. 1 showing a time delay inserted by the system into the second users signal.

FIG. 11 depicts time delay resistant codes in accordance with the invention illustrated for two users.

FIG. 12 depicts more time delay resistant codes in accordance with the invention illustrated for two users.

FIG. 13 depicts additional time delay resistant codes in accordance with the invention illustrated for two users.

FIG. 14 depicts still more time delay resistant codes in accordance with the invention illustrated for two users.

FIG. 15 depicts more time delay resistant codes in accordance with the invention illustrated for two users.

FIG. 16 depicts additional time delay resistant codes in accordance with the invention illustrated for two users.

FIG. 17 depicts time delay resistant codes in accordance with the invention illustrated for two users.

FIG. 18 depicts still more time delay resistant codes in accordance with the invention illustrated for two users.

FIG. 19 depicts possible codes resulting from the invention of FIG. 3 illustrated for two users, further illustrating the results of a possible delay inserted by the CDMA system.

DETAILED DESCRIPTION OF THE INVENTION

In CDMA systems, each cell generally employs the same PN code for all of the users in that cell. In orthogonal CDMA systems, each cell also employs a limited number of orthogonal codes or quasi-orthogonal codes such as Walsh, Gold or some other substantially orthogonal code which it distributes to the different users. (Reference herein to orthogonal, quasi-orthogonal or substantially orthogonal codes should be understood to include any or all of these codes). The PN code is generally combined with the orthogonal code to form a spreading code which suppresses inter-cell interference; however, it is also possible to design a system which does not employ PN codes.

Communications by different users may experience different time delays due to time jitter (imprecise implementation of time alignment algorithms), propagation delay and/or multi-path dispersion, which will cause mutual interference. For ease of explanation, the present invention is being described with reference to signals originating from two different users, however, the present invention also applies to signals from a single user transmitted over various paths. N-chip resistant spreading increases the robustness of the system against such time delays. One way the present system achieves N-chip resistance is by providing to different users, spreading sequences which have a zero cross-correlation or small cross-correlation when they are aligned and zero or small cross-correlation values when they are off by one or more chips. An example of this would be a conventional orthogonal spreading code such as a Walsh code with one or more zeros inserted therein (not shown). The placement of the zero(s) will be discussed herein with reference to systems which include PN codes. The allowable placement is the same for both types of systems. For single path channels this spreading scheme could be used by a single user as a means of delay diversity to combat the effects of fading in the path. For example, a user could transmit data over a channel using one spreading code then retransmit the same data over the same channel using a different spreading code. If the zeros in one code align with the non-zero chips of the other code, then (i) the two codes will cross correlate to zero, and (ii) the likelihood that at least one of the codes is received correctly is increased.

Figure 3:
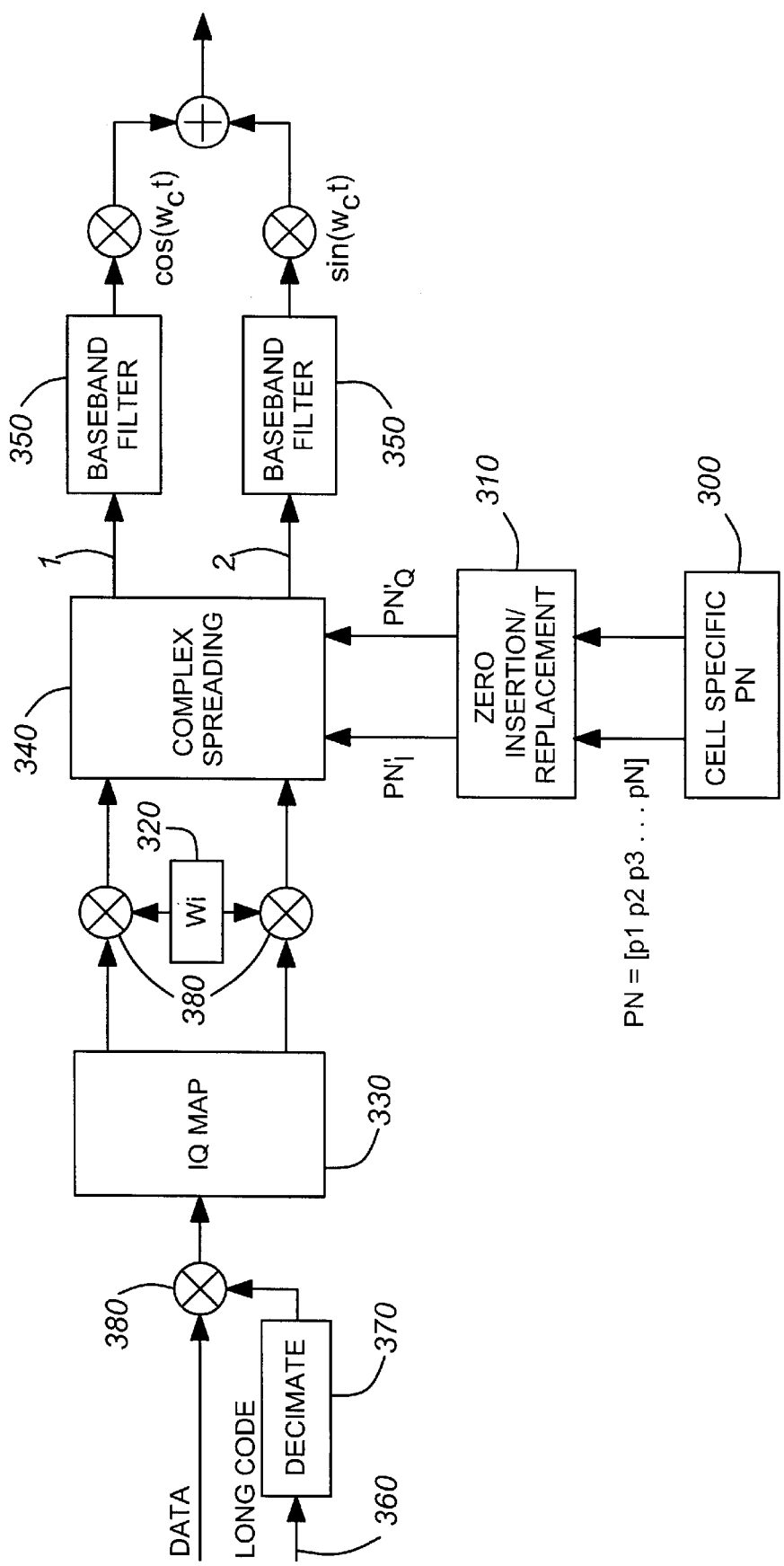
FIG. 3 depicts a block diagram of the preferred embodiment of a system for generating spreading codes which are resistant to the effects of time delays caused by CDMA systems in accordance with the invention.

FIG. 1 illustrates the signals for two users at points (1) or (2) in FIG. 3, in a CDMA system employing conventional spreading codes. Assuming (i) that the combined transmitter and receiver filter is an ideal Nyquist filter; (ii) perfect clock and carrier recovery; and (iii) the samples are taken at ideal sampling points, FIG. 1 also illustrates the signals at the receiver before despreading. Each orthogonal code W is made up of chips represented by $W_{x,y}$ where x represents the user and y represents the chip number. FIG. 1 also illustrates both users employing the identical PN code P. Each PN code P is also made up of chips $P_z$ wherein z represents the chip number. There is no need for a double subscript for P since both users are using the same PN code. In the example illustrated in FIG. 1, the channel is nondispersive and the equipment employed does not experience any jitter. Thus, since the PN code chips transmitted during each time period are identical and the $W_{x,y}$ chips for those time periods are orthogonal, the chips from user 2 have a zero cross-correlation with the chips from user 1 (i.e. they do not interfere with each other).

FIG. 2 illustrates a more realistic model showing the results of a dispersive channel. FIG. 2 shows the same two users illustrated in FIG. 1, but in FIG. 2, user 2 experiences a one chip delay (i.e due to equipment jitter, multi-path delay, etc.). It will be apparent to one skilled in the art that this relative delay could be greater or less than the delay shown. Because of this delay, the PN code chips at a particular time are no longer identical and therefore the $W_{x,y}P_z$ chips are no longer orthogonal. As such, the two signals will interfere with each other.

The spreading codes generated by the present invention, as illustrated in FIGS. 11–19, are less sensitive to delays, and in some instances are unaffected by delays. Those skilled in the art will recognize that the present invention may add zeros to the code instead of replacing chips or it may add some zeros and replace some chips with zeros.

FIG. 11 shows different possible spreading codes in accordance with the present invention. In the first code 10 every odd numbered PN code chip is replaced with a zero. When the altered PN code is combined with the orthogonal code W, the orthogonal code chips $W_{x,y}$ are only combined with the non-zero PN code chips. As seen from the illustration of FIG. 19, if neither user experiences a delay, or if they both experience the same delay, the PN code chips match up during each time period, the $W_{x,y}$ chips remain orthogonal and the two signals cross correlate to zero (i.e do not interfere). If, using the spreading code 10, (i) user 1 experiences a delay of one chip or an odd number of chips relative to user 2, or (ii) a signal from user 1 transmitted over one path experiences a 1 chip or odd number of chips delay relative to a signal transmitted over a second path, the chips from each signal will still cross correlate to zero since each of the non-zero chips will align with a zero. Thus, this code is resistant to odd numbered chip misalignments caused by delays. As seen from the progression from code 10 to code 20 etc. of FIG. 11, the number of zeros that can be added is only limited by the number of total chips in the PN code. In other words, the progression of FIG. 11 shows that the spreading code may include as few as 1 zero between each non-zero chip and as many as all zeros between only two non-zero chips. It will be apparent to one skilled in the art that the more zeros that are added, the more resistant the code is to delays, however the number of users that can simultaneously use the cell is reduced.

FIG. 12 is similar to FIG. 11, with the exception that replacement of chips with zeros begins with the first chip of the spreading code. In the codes illustrated in FIG. 11, the replacement of chips begins with the second chip of the code. The overall performance of the codes 30, 40 etc. illustrated in FIG. 12, however, should be very similar to the overall performance of the codes 10, 20 etc. in FIG. 11.

FIGS. 13–15 illustrate that one or more consecutive zeros may be substituted between groupings of consecutive non-zero chips. These codes 50, 60, 70, 80, 90, 100, 110, 120 have different levels of resistance to different delays than the codes illustrated in FIGS. 11 and 12, and in some instances are less resistant to delays than the codes illustrated in FIGS. 11 and 12. While codes 10, 60 and 90 allow for the same number of simultaneous users of the cell they are resistant to different time delays (i.e code 10 cross correlates to zero at no delay, one chip delay and odd number of chip delays while code 60 cross correlates to zero at no delay, 2 chip delay and even numbered chip delays, etc.). The remainder of these codes have the advantage over the codes of FIGS. 11 and 12 of allowing more simultaneous users of the cell while still outperforming conventional codes. Certain of these codes are not as resistant as those illustrated in FIGS. 11 and 12 because unless the number of consecutive zeros is the same as the number of consecutive non-zero chips and the chip delay is essentially the same as that number or a multiple thereof, not all of the chips will cross correlate to zero. If however, the delay is the same as (or certain multiples thereof) the number of consecutive zeros and consecutive non-zero chips, the cross-correlation is zero and there will be no interference.

FIG. 13 illustrates that groupings of two consecutive non-zero chips may be separated by as few as one zero chip 50, to a maximum number of zeros where only the first two and the last two consecutive chips are non-zero. FIG. 14 illustrates that groupings of three consecutive non-zero chips may be separated by as few as one zero chip 70, to a maximum number of zeros where only the first three and the last three consecutive chips are non-zero. FIG. 15 illustrates that the number of consecutive non-zero chips may be anywhere from 2 as seen from FIG. 13 to a maximum where only one or two zeros are substituted into the code.

FIGS. 16–18 illustrate similar codes to those of FIGS. 13–15 with the exception that in FIGS. 16–18, the replacement of chips by zeros begins with the first chip of the spreading code. In FIGS. 13–15, the replacement of chips with a zero begins with the second chip. These codes 130, 140, 150, 160, 170, 180, 190, 200, 210, are also resistant to different delays from the codes illustrated in FIGS. 11 and 12 for the same reasons as those of FIGS. 13–15, and these codes have the same advantage as those in FIGS. 13–15 over the codes of FIGS. 11 and 12 of allowing more simultaneous users of the cell. The effect of replacing the first chip with a zero is that the minimum number of zeros which may be substituted into the code is two, one at each end, and the maximum number would be two less than the total number of chips in the code.

FIG. 3 illustrates an apparatus for generating spreading codes in accordance with the present invention. The apparatus shown is a reverse link transmitter, but the invention is also applicable to a forward link transmitter. As illustrated in FIG. 3, the system includes long code generator 360 coupled to decimator 370. Decimator 370 is coupled to a multiplier 380 for combining the decimated long code generated by long code generator 360 and decimator 370. The resultant signal is then split by splitter 330 into its in-phase portion (I) and its quadriture phase portion (Q). Both outputs (I and Q) from data splitter 330 are combined with a Walsh code from Walsh code generator 320 by multipliers 380. While a Walsh code generator 320 is disclosed, any other suitable orthogonal code generator could be employed without departing from the scope of the present invention. Further, while multipliers are disclosed, exclusive OR's could also be employed. The system also includes a PN code generator 300. PN code generator 300 is coupled to a microprocessor 310 which is configured to replace certain chip(s) from the PN code generated by PN code generator 300 with a zero or pad the PN code with zero(s). It will be apparent to one skilled in the art that one or more of the generators of FIG. 3 could be the same or different microprocessors 310 and that the microprocessor 310 could be some other device such as an application-specific integrated circuit (ASIC), programmable gated logic array (PGLA), or another suitable logic device. The system further includes complex spreader 340 which could also be the microprocessor 310 or another microprocessor 310 or a multiplexor or the like. Complex spreader 340 combines the I and Q signals from the multipliers 380 with the PN code by combining the non-zero chips of the PN code with the chips of the Walsh code. The resulting signals are then filtered by baseband filters 350 and modulated onto the channel.

Figure 4:
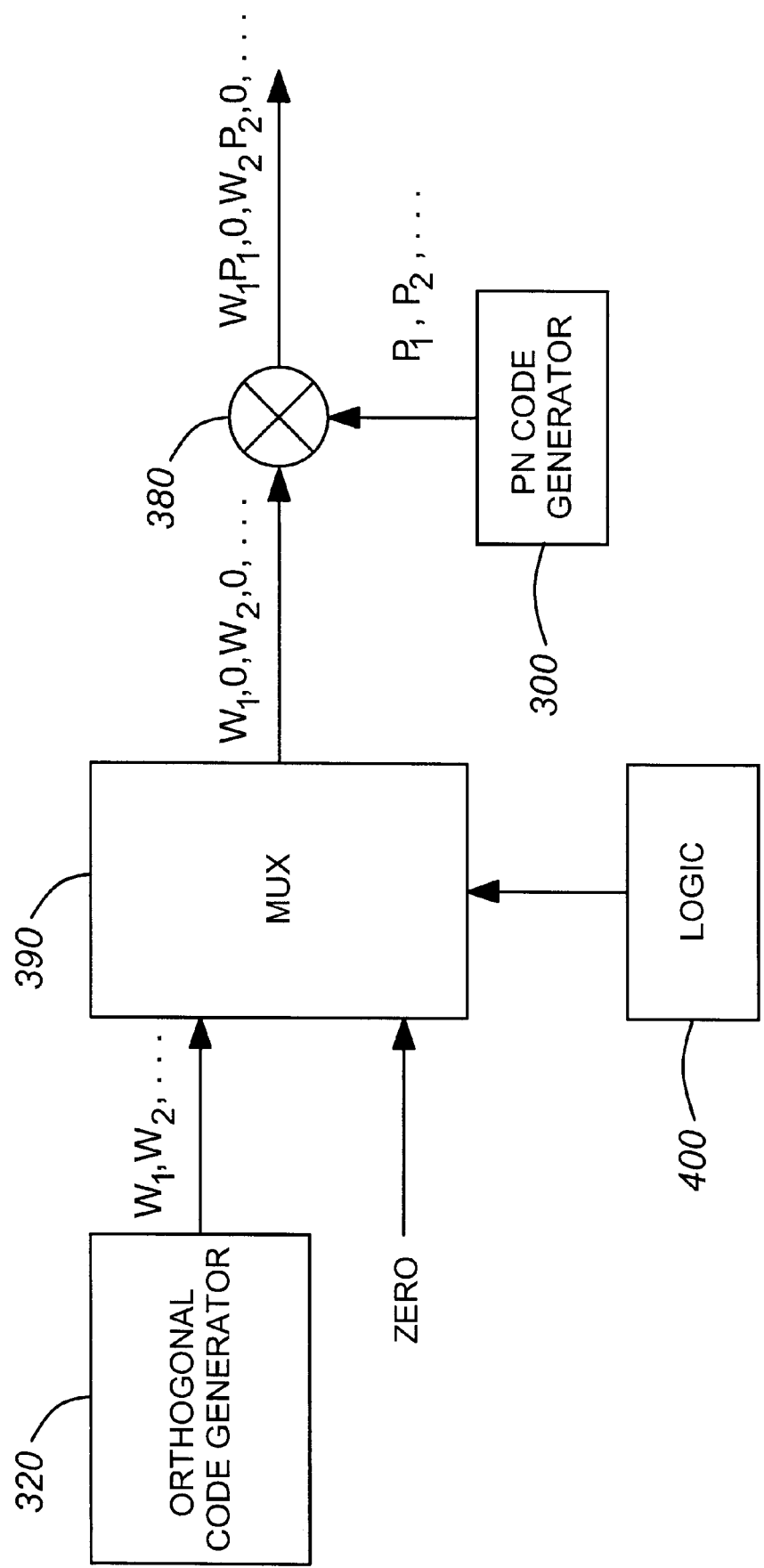
FIG. 4 depicts a block diagram of an alternate embodiment of the present invention, illustrating zeros being added to the orthogonal code.
Figure 5:
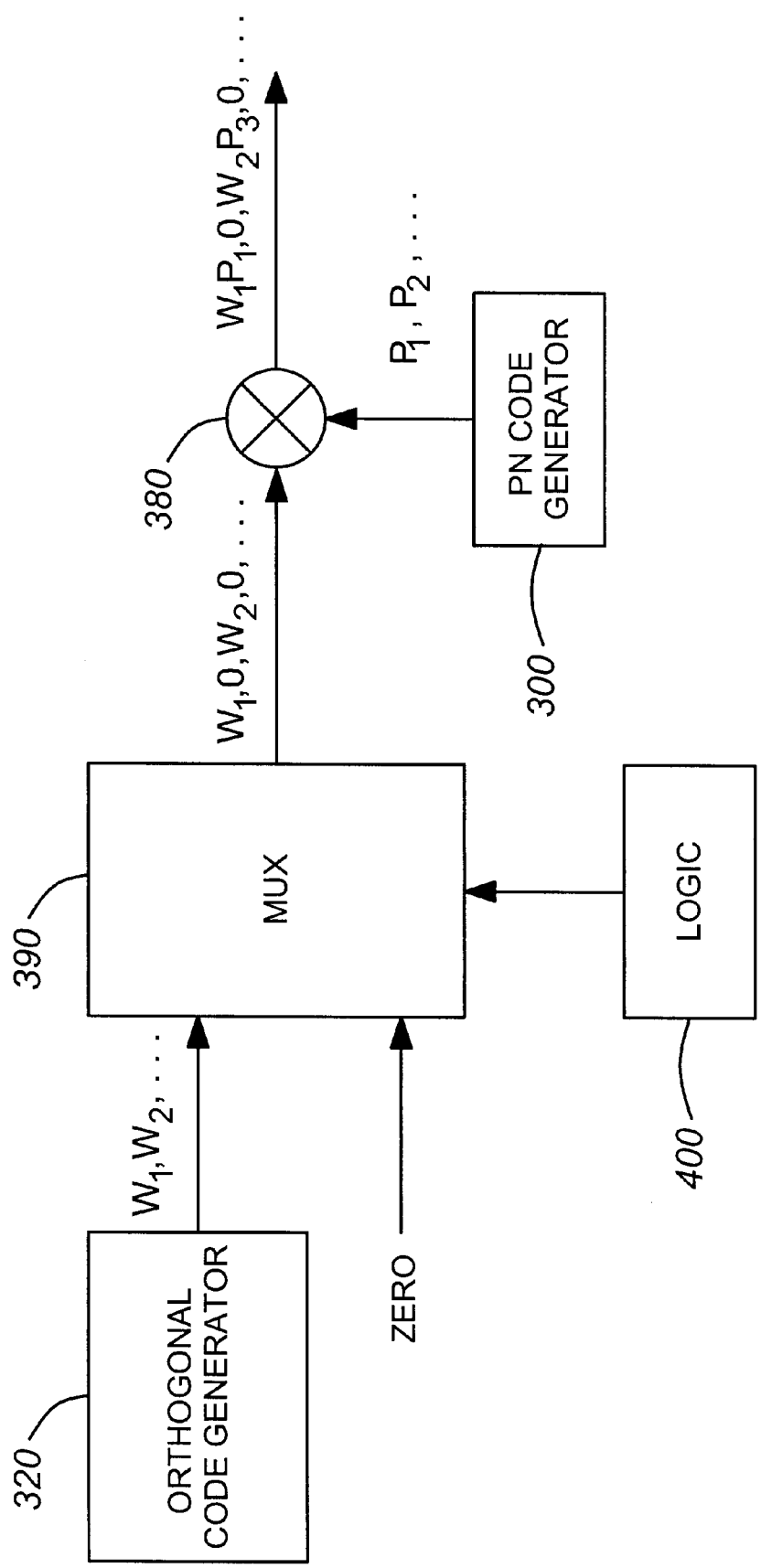
FIG. 5 depicts a block diagram of the embodiment of FIG. 4, illustrating a different possible code being generated by the same apparatus.

FIGS. 4–10 illustrate different embodiments of the present invention which are capable of producing spreading codes in accordance with the present invention. FIG. 4 illustrates an embodiment including an orthogonal code generator 320, and a logic controlled multiplexor 390 which inserts zeros into the orthogonal code. This embodiment further includes a PN code generator 300 which generates code at the same rate as the output of the multiplexor 390 (as illustrated in FIG. 5) or at a fraction of that rate as illustrated in FIG. 4. Although FIG. 4 illustrates the PN code generator 300 operating at half the speed of the multiplexor output, different fractions are also within the scope of the invention.

Figure 6:
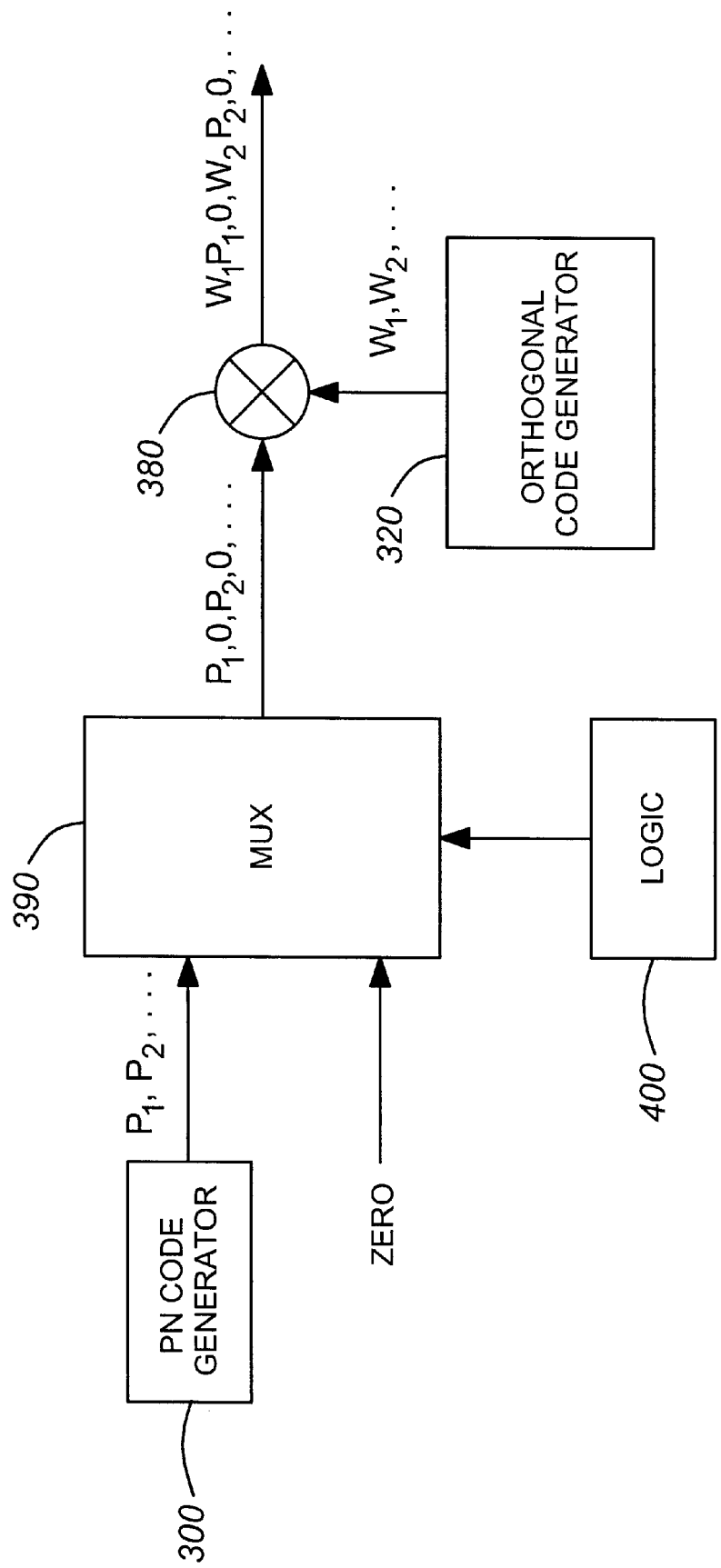
FIG. 6 depicts a block diagram of an alternate embodiment of the present invention illustrating zeros being added to the PN code.

FIG. 6 illustrates a similar embodiment to that in FIGS. 4 and 5, with the exception that the position of the PN code generator 320 and the orthogonal code generator 320 are reversed.

Figure 7:
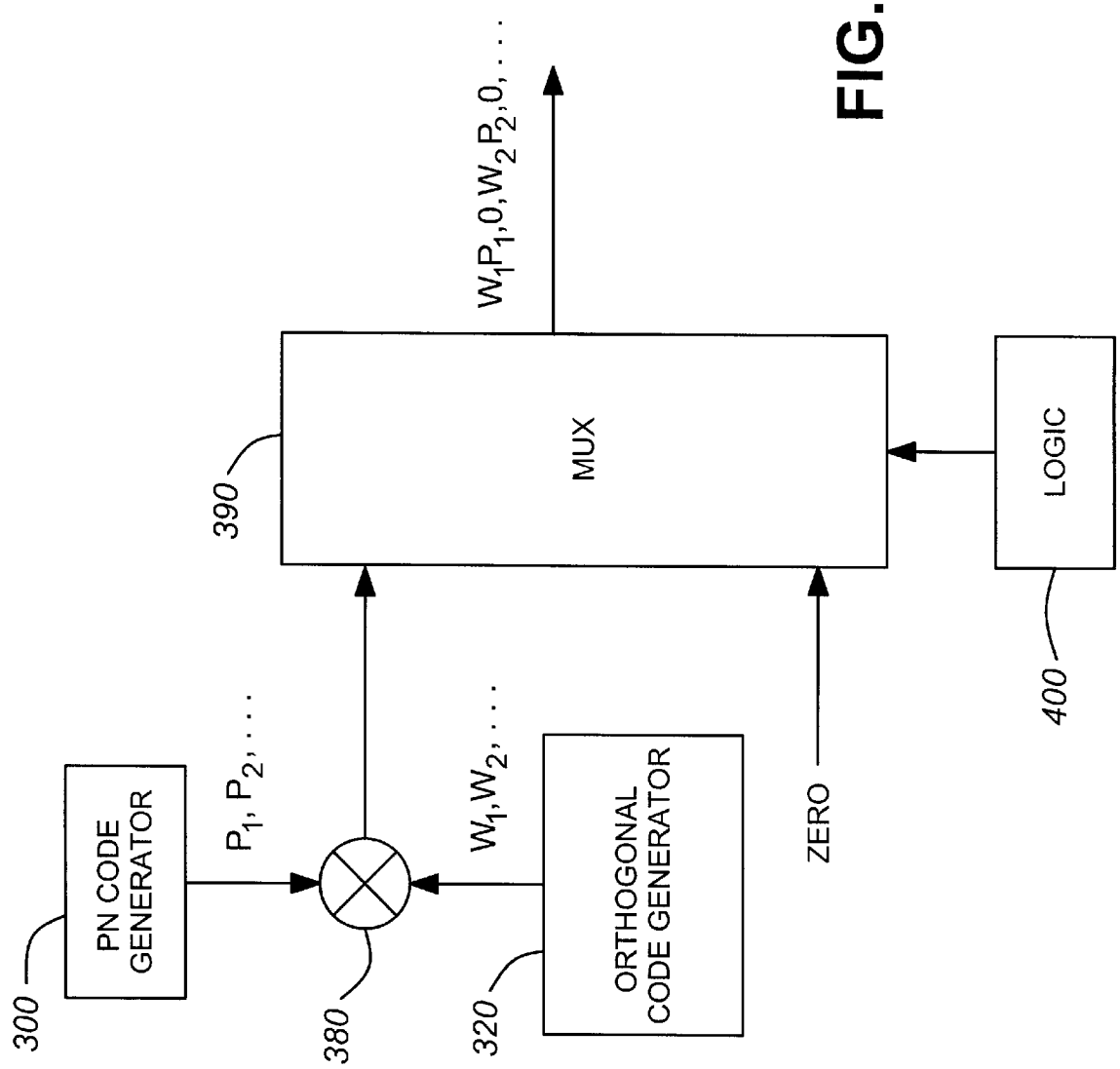
FIG. 7 depicts a block diagram of an alternate embodiment of the present invention, illustrating an orthogonal code being combined with a PN code prior to inserting zeros.

FIG. 7 illustrates that the PN code and the orthogonal code may be combined before zeros are added to the code. In FIG. 7, the PN code generator 300 and the orthogonal code generator 320 are connected to a multiplier 380 whose output in input to the multiplexor 390. The multiplexor 390 then adds zeros into the combined code.

Figure 8:
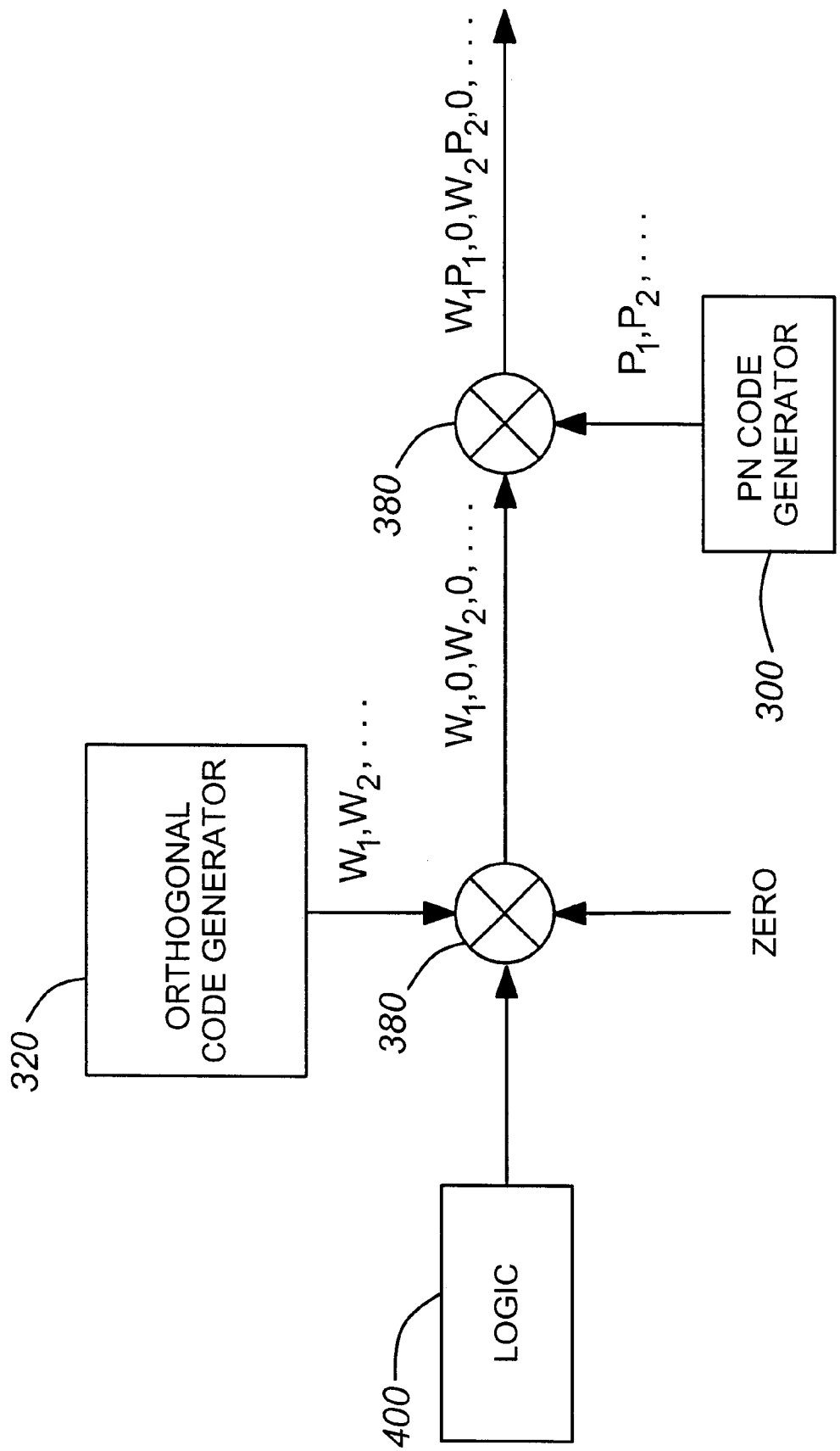
FIG. 8 depicts a block diagram of an alternate embodiment of the present invention illustrating the use of a multiplier to add zeros to an orthogonal code.
Figure 9:
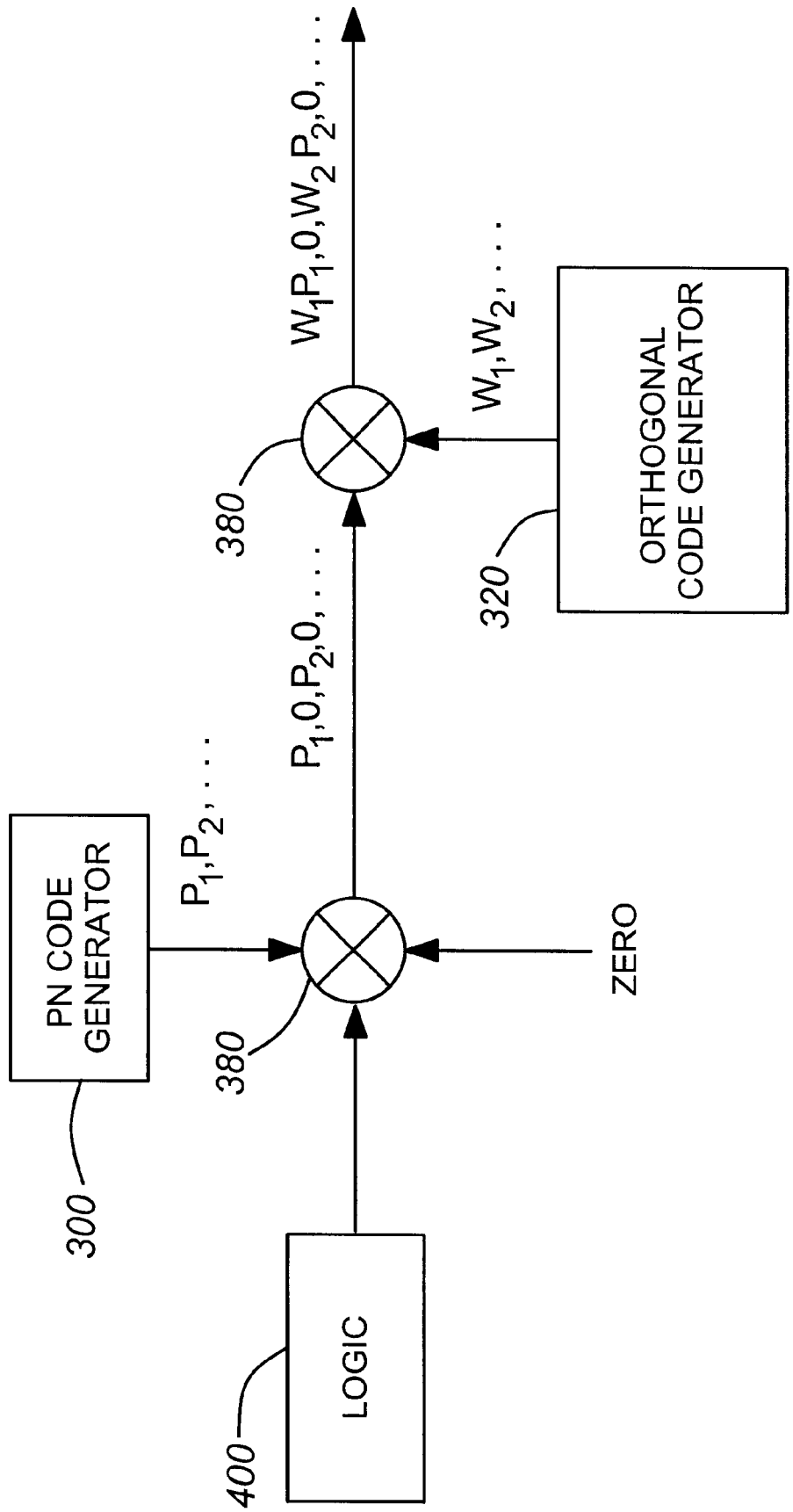
FIG. 9 depicts a block diagram of an alternate embodiment of the present invention illustrating the use of a multiplier to add zeros to a code.
Figure 10:
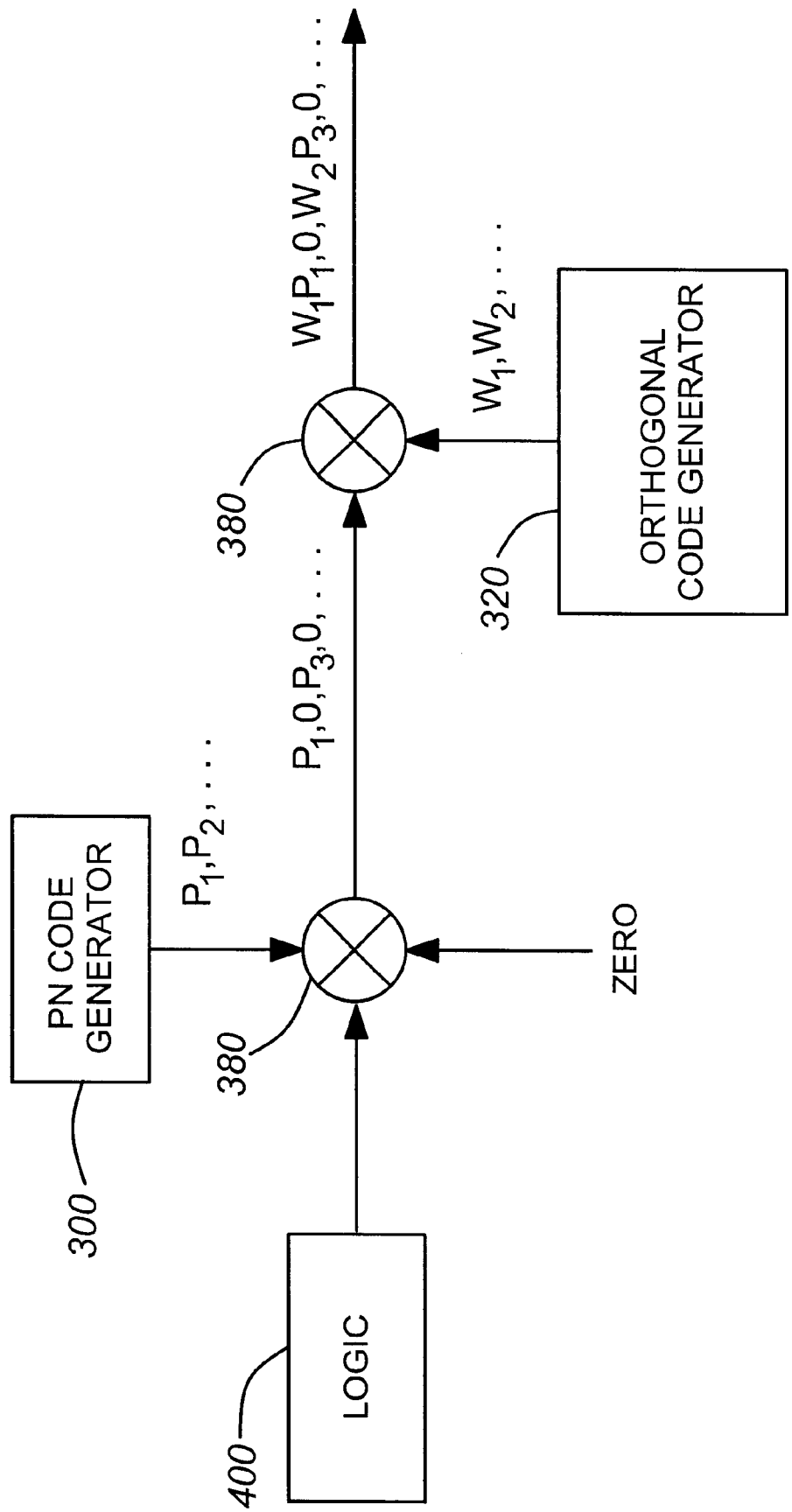
FIG. 10 depicts a block diagram of the embodiment of FIG. 9 illustrating a different possible code being generated by the same apparatus.

FIGS. 8–10 illustrate the multiplexor 390 of FIGS. 4–6 may be replaced by a multiplier to achieve similar results. While not illustrated, one skilled in the art will also recognize that the multiplexor 390 in FIG. 7 could also be replaced by a logic controlled multiplier to achieve similar results.

It will thus be seen that the invention efficiently attains the objects set forth above, among those made apparent from the preceding description. In particular, the invention provides apparatus and methods of generating spreading codes which are resistant to the effects of time delays encountered in CDMA systems. Those skilled in the art will appreciate that the configurations depicted in FIGS. 3–19 reduce the effects of time lag.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a wireless communication system, a method of generating spreading codes comprising:
   generating a substantially orthogonal code including a plurality of chips; and,
   generating a new substantially orthogonal code by inserting at least one zero into said substantially orthogonal code,
   said generating a new substantially orthogonal code including:
      generating a pseudonoise (PN) code including a plurality of chips;
      generating a new PN code from said PN code by replacing at least one of said chips with a zero, wherein said new PN code includes at least one zero chip and at least one non-zero chip; and,
   combining said new PN code and said substantially orthogonal code wherein:
      said new PN code includes odd numbered chips and even numbered chips; and; said generating said new PN code includes:
         replacing a first of said PN code chips with a zero; and, replacing a remainder of said odd numbered PN code chips with a zero.

2. In a wireless communication system, a method of generating spreading codes comprising:
   generating a substantially orthogonal code including a plurality of chips; and,
   generating a new substantially orthogonal code by inserting at least one zero into said substantially orthogonal code,
   said generating a new substantially orthogonal code including:
      generating a pseudonoise (PN) code including a plurality of chips;
      generating a new PN code from said PN code by replacing at least one of said chips with a zero, wherein said new PN code includes at least one zero chip and at least one non-zero chip; and,
   combining said new PN code and said substantially orthogonal code wherein:
      said new PN code includes odd numbered chips and even numbered chips; and;
      said generating said new PN code includes replacing said even numbered PN code chips with a zero.

3. In a wireless communication system, a method of generating spreading codes comprising:
   generating a substantially orthogonal code including a plurality of chips; and,
   generating a new substantially orthogonal code by inserting at least one zero into said substantially orthogonal code,
   said generating a new substantially orthogonal code including:
      generating a pseudonoise (PN) code including a plurality of chips;
      generating a new PN code from said PN code by replacing at least one of said chips with a zero, wherein said new PN code includes at least one zero chip and at least one non-zero chip; and,
   combining said new PN code and said substantially orthogonal code wherein:
      said new PN code includes a plurality of chips; and,
      said generating said new PN code comprises:
         replacing a first of said PN code chips with a zero; and, replacing every Nth PN code chip thereafter with a zero, wherein N is a number greater than 2.

4. In a wireless communication system, a method of generating spreading codes comprising:
   generating a substantially orthogonal code including a plurality of chips; and,
   generating a new substantially orthogonal code by inserting at least one zero into said substantially orthogonal code,
   said generating a new substantially orthogonal code including:
      generating a pseudonoise (PN) code including a plurality of chips;
      generating a new PN code from said PN code by replacing at least one of said chips with a zero, wherein said new PN code includes at least one zero chip and at least one non-zero chip; and,
   combining said new PN code and said substantially orthogonal code wherein:
      said new PN code includes a plurality of chips; and,
      said generating said new PN code includes:
         replacing every Nth PN code chip with a zero beginning with the Nth PN code chip, wherein N is a number greater than 1.

5. In a wireless communication system, a method of generating spreading codes comprising:

generating a substantially orthogonal code including a plurality of chips; and, generating a new substantially orthogonal code by inserting at least one zero into said substantially orthogonal code, said generating a new substantially orthogonal code including:

generating a pseudonoise (PN) code including a plurality of chips;

generating a new PN code from said PN code by replacing at least one of said chips with a zero, wherein said new PN code includes at least one zero chip and at least one non-zero chip; and, combining said new PN code and said substantially orthogonal code wherein:

said new PN code includes a plurality of chips beginning with a first chip; and, said generating said new PN code includes:

replacing a first set of consecutive PN code chips with a zero; and, replacing a second set of consecutive PN code chips with a zero wherein said first and second sets are not consecutive.

6. The method of generating spreading codes according to claim 5 wherein said first set of consecutive PN code chips includes said first chip.

7. The method of generating spreading codes according to claim 5 wherein said first set of consecutive PN code chips does not include said first chip.

8. The method of generating new spreading codes according to claim 7 wherein said substantially orthogonal code is a Gold code.

* * * * *